United States Patent

Shah et al.

Patent Number: 6,075,981
Date of Patent: Jun. 13, 2000

[54] METHOD FOR RESPONDING TO DCCH POINTERS

[75] Inventors: Amish K. Shah; Nadi S. Findikli; David Hoover, all of Cary, N.C.

[73] Assignee: Ericsson, Inc., Research Triangle Park, N.C.

[21] Appl. No.: 08/960,383

[22] Filed: Oct. 29, 1997

[51] Int. Cl.[7] .................................................. H04Q 7/22
[52] U.S. Cl. ........................ 455/403; 455/434; 455/515
[58] Field of Search ................................... 455/403, 434, 455/511, 515, 522

[56] References Cited

U.S. PATENT DOCUMENTS

| | | |
|---|---|---|
| 5,420,911 | 5/1995 | Dahlin et al. . |
| 5,541,978 | 7/1996 | Brunner et al. ............................ 379/60 |
| 5,570,467 | 10/1996 | Sawyer ................................... 455/33.1 |
| 5,574,996 | 11/1996 | Raith ..................................... 455/161.3 |
| 5,640,677 | 6/1997 | Karlsson ................................ 455/33.2 |
| 5,722,078 | 2/1998 | Przelomiec et al. .................... 455/452 |
| 5,768,267 | 6/1998 | Raith et al. ............................. 370/329 |
| 5,778,316 | 7/1998 | Persson et al. ......................... 455/434 |
| 5,790,955 | 8/1998 | Tomoike ................................ 455/453 |
| 5,953,665 | 9/1999 | Mattila ................................... 455/434 |

FOREIGN PATENT DOCUMENTS

0779751A2 of 1996 European Pat. Off. .
WO 97/34438 of 1997 WIPO .

OTHER PUBLICATIONS

"Intelligent Roaming," TR45.3.6/97.04.28.13, Source: AT&T Wireless Services, Inc., 57 pages.

*Primary Examiner*—Daniel S. Hunter
*Assistant Examiner*—Thuan Nguyen
*Attorney, Agent, or Firm*—Coats & Bennett, P.L.L.C.

[57] ABSTRACT

A method for responding to a pointer received on an analog control channel pointing to a control channel belonging to a forbidden service provider includes avoiding a power-up scan and resuming camping on the analog control channel. A wireless communications mobile unit is camped on an analog control channel may receive a channel pointer to a digital control channel. If the digital control channel has acceptable received signal strength, the service provider information for that control channel is checked. If the control channel belongs to a non-forbidden service provider, the mobile unit camps on the digital control channel. If the control channel belongs to a forbidden service provider, the mobile unit returns to camping on the analog control channel without performing an intervening power-up scan. By avoiding power-up scans when the pointed-to channel belongs to a forbidden service provider, less power is consumed and users receive more consistent communications service.

24 Claims, 4 Drawing Sheets

METHOD FOR RESPONDING TO DCCH POINTERS

FIELD OF THE INVENTION

The present invention relates generally to the communications field and, in particular, to a method for reducing the amount of time and resources required to respond to digital control channel pointers received on an analog control channel in a wireless communications system.

BACKGROUND OF THE INVENTION

Analog wireless communications systems have been long established in the United States and elsewhere. For example, the advanced mobile phone service (AMPS) cellular telephone system was developed in the early 1970s and is still in widespread use in the United States today. The AMPS system uses Frequency Division Multiple Access (FDMA) to provide shared access to the available communications spectrum. With FDMA, users are assigned to a channel from a limited set of communications channels in the available communications spectrum. In typical AMPS systems, 25 kHz communications channels are used whose carriers are separated by 30 kHz. The number of available channels is limited by the size of the available communications spectrum. When a user places a call, the user is assigned to one of the available channels. If no channel is available, the user's call is blocked. Unfortunately, the increasing demand for cellular services has resulted in a corresponding increase in the frequency of call blocking, particularly in congested urban areas.

Recent advances in digital communications allow for an increase in network capacity without requiring allocation of additional communications spectrum. In addition to FDMA, digital wireless communication systems use time division multiple access (TDMA) or code division multiple access (CDMA) to allow multiple users to share the same carrier channel frequency, thereby increasing network capacity. In a TDMA system, for example, a single RF carrier is divided into time frames of a pre-defined length. Each time frame is further divided into plural time slots, each time slot representing a separate communications channel. A plurality of users can transmit and receive data in short bursts in respective time slots, thereby allowing a plurality of users to share a single carrier channel frequency.

Another advantage of digital systems is improved voice quality. In an analog system, physical influences or disturbances in radio transmission links are sometimes passed into the audio path of the receiver, creating static, hums, hisses, crackling sounds, cross-talk and fade-outs in the received voice signal. In digital communication systems, the audio signal is transformed into digital data patterns and digital coding and error correction methods allow the audio signal to be reconstructed at the receiving end of the transmission. Digital signal processing techniques eliminate many of the effects of disturbances in the radio transmission link.

Because of these and other advantages of digital communications, there has been a move to retire existing analog cellular systems in favor of digital cellular systems. However, there is a large investment in the current analog infrastructure and it is not practical to completely abandon existing analog systems. Moreover, there are millions of existing analog-only mobile phones in use which require analog infrastructure to operate. The transition to digital systems will likely take many years or decades. Consequently, it can be expected that cellular services in the U.S. will consist of a mixture of analog and digital systems.

Several dual-mode systems have been developed which handle both analog and digital communications. In the United States, the predominant dual-mode systems are operated according to the protocol described in Telecommunications Industry Association Interim Standard IS-136. Within IS-136 and similar systems, digital communications are more desirable, but both analog and digital modes are supported.

Analog, digital, and dual-mode wireless communications systems typically employ a large number of discrete communication channels for communicating voice and data from one location to another and for controlling system functions. Further, it is also common for there to be multiple communications service providers in competition with each other for each type of communication service. As such, within a given geographical area it is typical for the various communication channels to be allocated to the different competitors such that only one service provider is responsible for providing service on any given channel.

To facilitate communications channel allocation, the spectrum of channels may be divided into several channel bands, each containing a plurality of communications channels. Thereafter, an entire channel band may be allocated to a particular service provider for a given geographic region. Thus, in a certain region, service provider Alpha may be allocated channel bands A and C, while service provider Beta may be allocated channel band B, and service provider Gamma all other channel bands. The particular details of the channel band allocations are well known in the industry.

The various service providers are typically in competition with each other. However, many service providers have bi-lateral agreements under which subscribers (users) to one service provider may use the communications network of another service provider. Despite the prevalence of such agreements, some service providers have no such agreements with particular other service providers for competitive reasons. For example service provider Alpha may have a sharing agreement with service provider Beta, but no agreement with service provider Gamma. Users who are subscribed to Alpha may use communications channels belonging to service provider Beta, but should not use any channels belonging to service provider Gamma. In order to ensure this, the Alpha mobile units are typically given a list of service providers that are forbidden to be used; in this example, the list would include Gamma but not Beta.

During use, it is common for the mobile unit to be directed from one channel to another, an event which can be triggered by a wide variety of reasons. For example, a dual-mode cellular phone may initially camp on an analog control channel. Because digital mode operation is preferred, it is common for a digital control channel pointer to be broadcast periodically on the analog control channel when the wireless communications system is dual-mode capable. When the phone detects the digital control channel pointer, the mobile phone ideally camps on the pointed-to digital control channel and operates thereafter in digital mode.

Unfortunately, in some instances, the digital control channel pointer may be pointing to a digital control channel that belongs to a service provider that the phone should not be using. In such situations, the prior art suggests that the mobile phone should initiate a power-up scan rather than camp on the undesirable digital control channel. However, if the mobile phone is camped on an analog control channel, it is probable that the mobile phone found no suitable digital control channel during the last power-up scan. As such, it is likely that the mobile phone will simply end up camping on the same analog control channel after the power-up scan. If so, the power-up scan has served no useful purpose. Because a power-up scan utilizes substantial system resources including mobile unit power, it is desirable to avoid useless power-up scans.

Therefore, it is desirable for mobile phone to avoid power-up scans when a digital control channel pointer is received on an analog control channel that points to a control channel belonging to a service provider that the mobile phone is forbidden to use.

SUMMARY OF THE INVENTION

The present invention provides a method for avoiding power-up scans when the pointed-to control channel belongs to a service provider that the wireless communications mobile unit is forbidden to use. The wireless communications mobile unit receives a list of forbidden service providers and camps on an analog control channel. Thereafter, the mobile unit receives a channel pointer to a digital control channel. If the digital control channel has acceptable received signal strength, the service provider information for that control channel is checked. If the control channel belongs to a non-forbidden service provider, the mobile unit camps on the digital control channel. If the control channel belongs to a forbidden service provider, the mobile unit returns to camping on the analog control channel without performing an intervening power-up scan. To increase efficiency, the mobile unit optionally keeps track of the last pointed-to channel and disregards subsequent pointers to that channel. By avoiding power-up scans when the pointed-to channel belongs to a forbidden service provider, less power is consumed and users receive more consistent communications service.

DETAILED DESCRIPTION OF THE INVENTION

Figure 1:
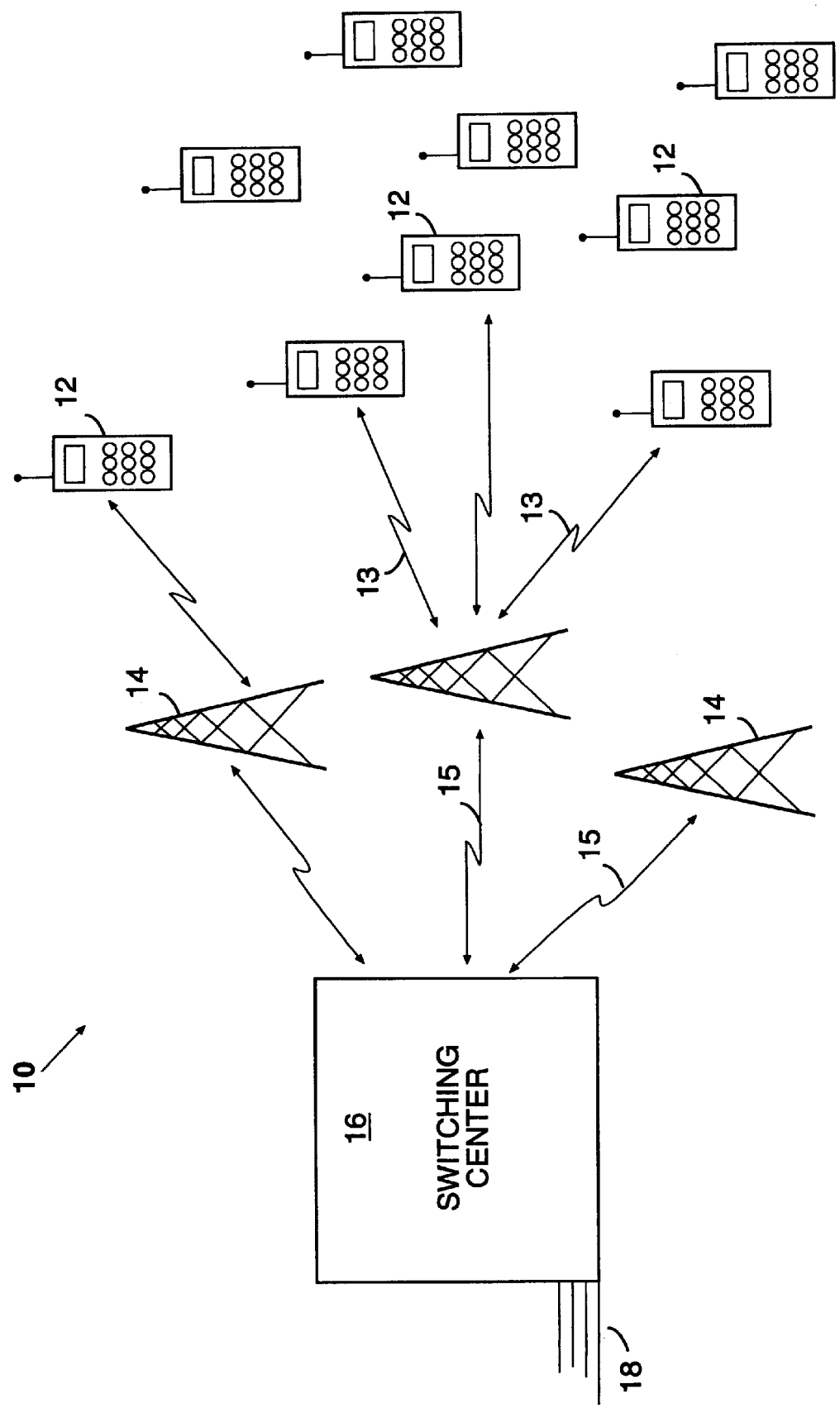
FIG. 1 is a simplified representation of a cellular telephone wireless communications system

A wireless communications system 10 typically includes numerous mobile units 12 (e.g., cellular telephones), a plurality of base stations 14, and one or more switching centers 16 connecting the wireless communications system 10 to other communications systems 18, such as the public switched telephone network (see FIG. 1). Typically, the mobile units 12 communicate with the base stations 14 using radio links 13. Likewise, the base stations 14 typically communicate with the switching center 16 via radio links 15.

Figure 2:
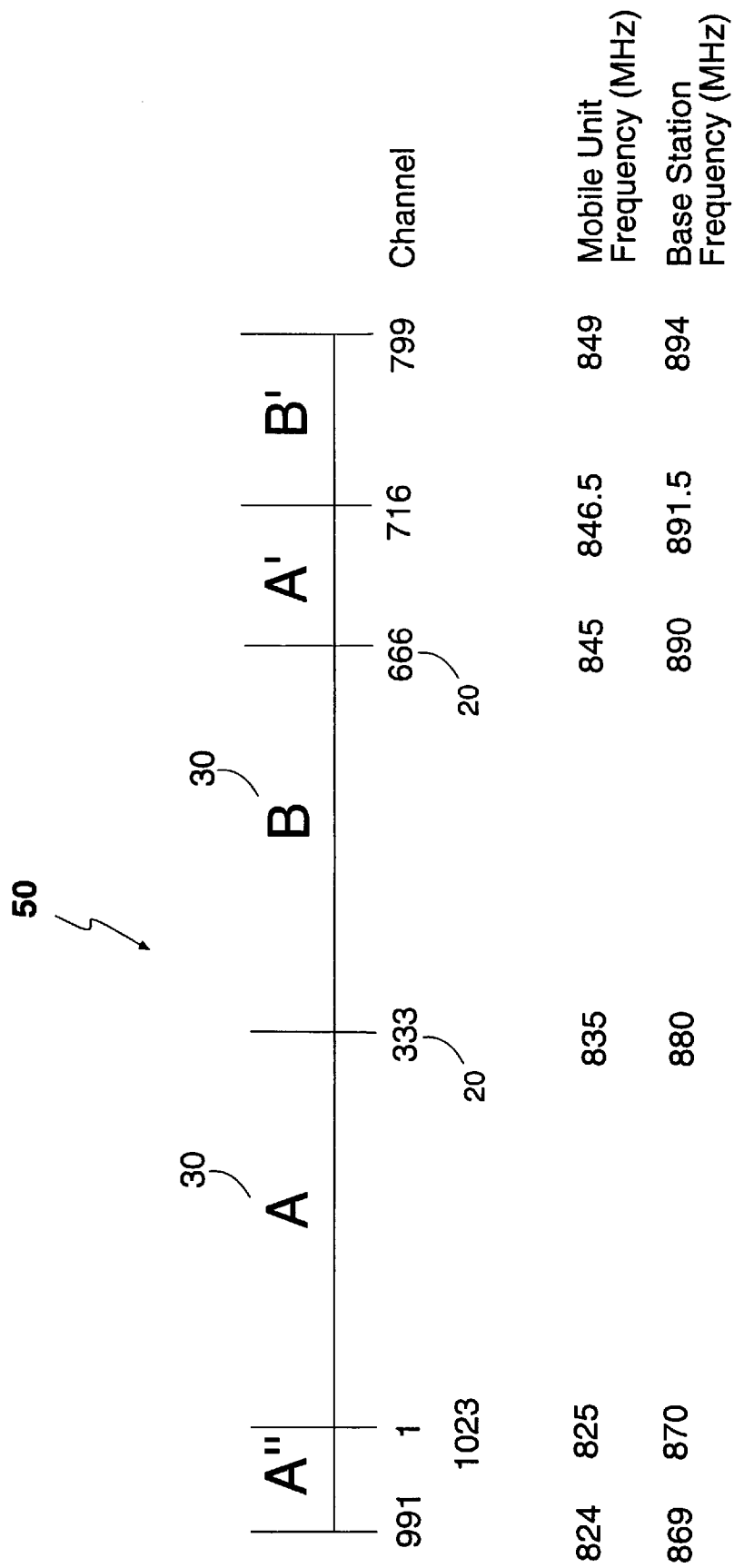
FIG. 2 is a flow diagram of is an example of a typical communications spectrum organization showing channel bands.

The radio links 13 typically include numerous discrete communications channels 20 on one or more communications spectrums 50 (see FIG. 2). A communications channel 20 is typically a pair of frequencies, one transmit and one receive, used by a mobile unit 12 to communicate within a wireless communications system 10. Some communications channels 20 are for control functions (control channels) while others are for voice and data communications (traffic channels). Examples of control functions include locating a particular mobile unit 12, establishing a new communications session, and transferring oversight of a communications session from one base station 14 to another.

The available communications spectrum 50 for wireless communications is divided into a plurality of "channel bands" 30 each of which comprises a plurality of communications channels 20. The channel bands 30 are allocated as a unit to the various competing communications service providers. In a particular geographic area, only one service provider will provide service within any given channel band 30. However, other service providers may provide service in a different channel band 30. Thus, at any given location, a mobile unit 12 is likely to be within the service area of a plurality of different service providers all of which operate in different channel bands 30. Because some service providers will offer digital services while others offer analog services, the mobile unit 12 may have a choice between the two types of services.

For a particular mobile unit 12, the various service providers may be classified as either a Home SP, a Partner SP, a Favored SP, a Neutral SP, or a Forbidden SP. When acquiring service on a control channel 20, the mobile unit 12 will scan the available control channels and make a selection based on the service provider classification. Home SPs and Partner SPs are preferred over all others and are known as acceptable service providers. A Favored SP has a lower priority than an acceptable SP, but a higher priority than a Neutral SP. The lowest classification is Forbidden SP. The mobile unit 12 will not register with a Forbidden SP except in emergencies, such as when "911" is dialed. As used herein, the term "Forbidden SP" refers to a service provider that should be used for communications only in emergencies. The mobile unit 12 should acquire service on a control channel 20 with the highest classification level.

It is common in wireless communications systems 10 for mobile units 12 to contain a programmable Intelligent Roaming Database (IRDB). The IRDB contains information that the mobile unit 12 uses during scanning operations. This information typically includes a listing of service provider identification codes, including a listing of Forbidden SP identification codes, a band search list, and various other control information. The identification codes used by the IRDB typically are System ID's (SID) and/or System Operator Codes (SOC).

The IRDB is commonly stored in semi-permanent memory in the mobile unit 12. That is, the IRDB is stored in the mobile unit 12 even while the mobile unit 12 is not in use, but the contents of the IRDB can be changed by the wireless communications system 10, possibly through over-the-air programming, or by an authorized technician. The mobile unit 12 user is typically not able to program the IRDB independently.

In practice, the IRDB is usually supplemented by the Number Assignment Module (NAM). The NAM is programmable memory containing specific information about a mobile unit 12 such as the electronic serial number, phone number, and the like. Like the IRDB, the NAM is semi-permanent memory. However, it should be rioted that the electronic serial number portion of the NAM is typically only programmable by the mobile unit 12's 12 manufacturer due to "cloning" concerns. The NAM also contains the identification code for the mobile unit 12's 12 Home SP. For simplicity of discussion, the NAM will be considered part of the IRDB.

Because digital operation is preferred, a dual-mode mobile unit 12 will look for a digital control channel (DCCH) pointer when the mobile unit 12 is camped on an analog control channel (ACC). The digital control channel pointer is a pointer to a specific digital control channel 20, usually identified by spectrum 50 (or hyperband) and a channel number. It is common for dual-mode wireless communications systems 10 to transmit DCCH pointers periodically on the ACC in order to promote digital operation. In IS-136 systems, the typical interval between DCCH pointers is one to five seconds.

A problem occurs when the service provider for the ACC is not the same service provider for the DCCH. For instance, a given mobile unit 12, subscribing to service from a given service provider, may consider the service provider for the ACC as "acceptable," but consider the service provider for the DCCH as "forbidden." To illustrate this, assume that a dual-mode mobile unit 12 is subscribed to service provider Alpha. Service provider Alpha provides both analog and digital service. Alpha has a bilateral sharing agreement with service provider Beta, an analog only provider, that allows all of Alpha's subscribers to use Beta for analog service, and vice-versa. Another service provider, Gamma, is a digital only provider. Gamma has a bilateral sharing agreement with Beta, but no agreement with Alpha. With respect to Alpha mobile units 12, Gamma is a Forbidden SP. The Alpha mobile unit 12 is in a cell which has no service from Alpha, but has analog service by Beta and digital service from Gamma. The system logic of the cell is to provide DCCH pointers on the Beta analog control channels that point to a Gamma digital control channel. The Alpha mobile unit 12 is camped on the Beta analog control channel and receives the DCCH pointer the Gamma DCCH. Because the Alpha mobile unit 12 is forbidden to use service provider Gamma (except in emergency situations), the DCCH pointer creates a problem.

Figure 3:
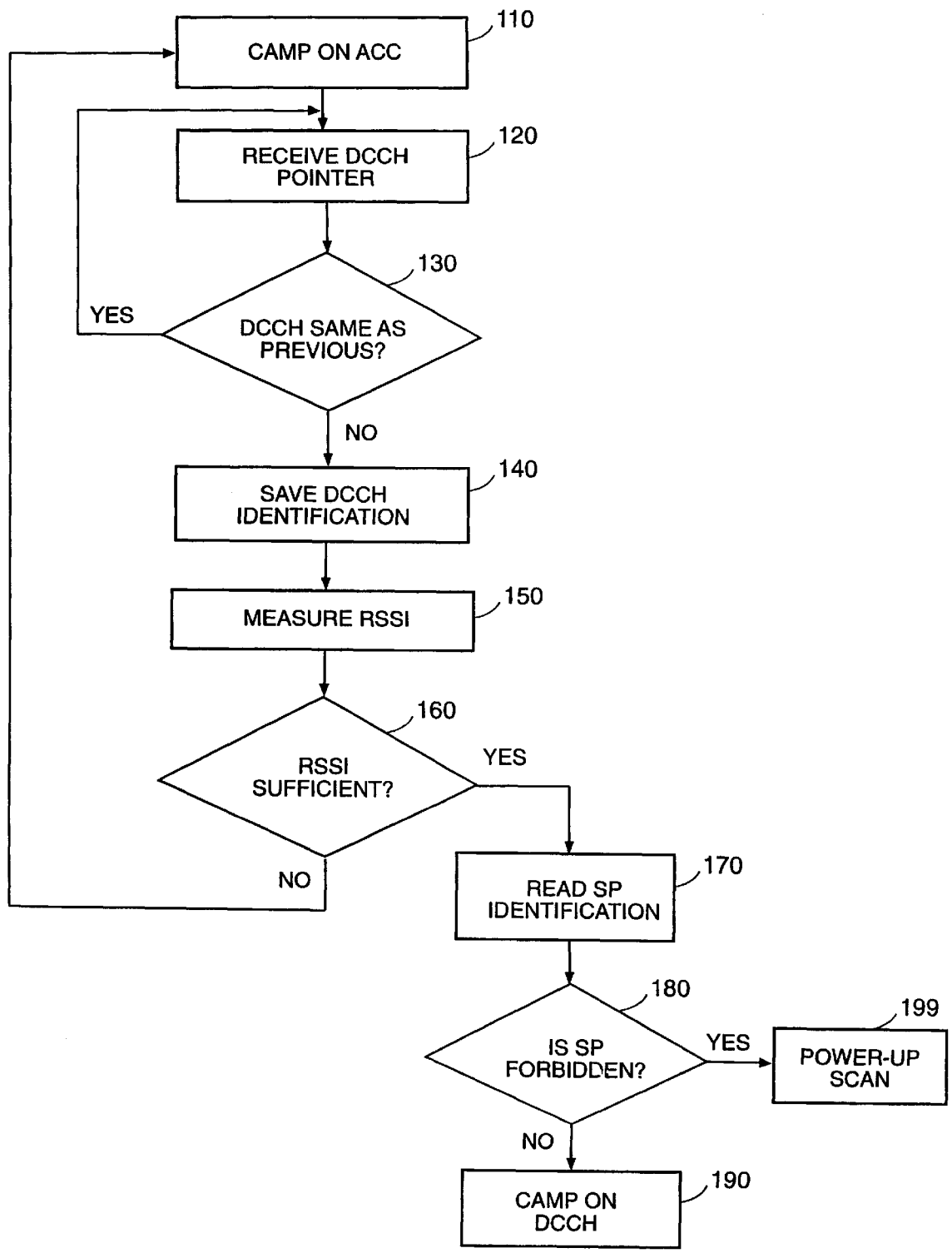
FIG. 3 is a flow diagram of the prior art method of responding to DCCH pointers.

Under the prior art, the mobile unit 12 would respond to this problem by initiating a power-up scan in response to a DCCH pointer directing the mobile unit 12 to a control channel 20 belonging to a Forbidden SP. The prior art method is shown in FIG. 3. While a dual-mode mobile unit 12 was camped on an ACC (box 110), a DCCH pointer was encountered (box 120). The mobile unit 12 would compare the channel identification against the previously received DCCH channel identification, if any (box 130). If the channel identifications matched, the DCCH pointer was disregarded and the mobile unit 12 remained camped on the ACC (box 110). Otherwise, the mobile unit 12 would store the channel identification (box 140) and thereafter check the received signal strength (RSSI) of the pointed-to channel (box 150). If the RSSI was insufficient (box 160), the mobile unit 12 would return to camping on the ACC (box 110). If the RSSI was sufficient (box 160), the mobile unit 12 obtained the service provider identification for the pointed-to DCCH (box 170). Typically the service provider identification was obtained by decoding the F-BCCH message of the DCCH. The F-BCCH is a logical channel which is used to broadcast DCCH structure parameters and other information essential for accessing the wireless communications system 10. In particular, encoded within the F-BCCH message, in a manner well known in the art, are several parameters relating to service provider identification. For typical IS-136 systems, these parameters include SID, and, if present, SOC.

If the service provider information indicated that the DCCH belongs to a nonforbidden service provider (box 180), the mobile unit 12 camped on the DCCH (box 190). If the service provider information indicated that the service provider was a Forbidden SP (box 180), the mobile unit 12 initiated a power-up scan (box 199).

During a power-up scan the mobile unit 12 scans channel bands 30 and attempts to obtain service on either an analog control channel 20 or digital control channel 20. A power-up scan typically requires that a large number of channels 20 be checked for RSSI and service provider information. Accordingly, a power-up scan consumes substantial mobile unit 12 resources.

If the mobile unit 12 was camped on an analog control channel 20, it is probable that the mobile unit 12 found no suitable DCCH during the last power-up scan. As such, it is possible that the mobile unit 12 will conclude the prior art process by camping on the same analog control channel after the power-up scan (box 110). Alternatively, the mobile unit 12 may conclude the prior art process by camping on a different analog control channel after the power-up scan. Note that if the mobile unit 12 camped on the same analog control channel, the mobile unit 12 will likely again receive the same DCCH pointer, which would be disregarded after comparison with the stored DCCH pointer (see boxes 130–140).

Because receiving a DCCH pointer to a DCCH belonging to a Forbidden SP would result in a power-up scan, but the power-up scan would likely return the mobile unit 12 to the previous analog control channel, the triggered power-up scan would not result in better service for the mobile unit 12. Instead, the mobile unit 12 would expend resources, e.g. time and power, running a power-up scan that merely identified the analog control channel that the mobile unit 12 was previously camped on.

Figure 4:
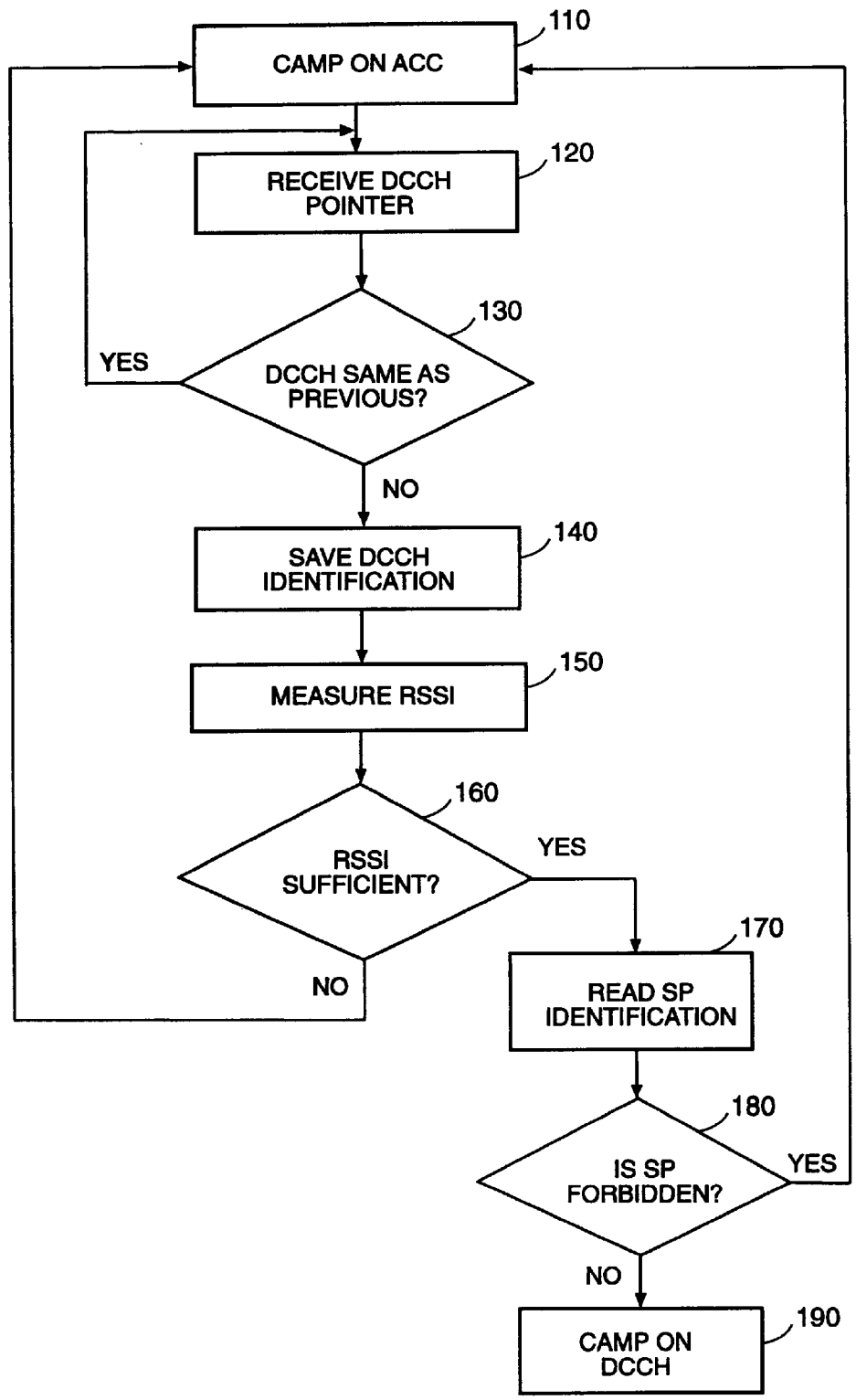
FIG. 4 is a flow diagram of the present method of responding to DCCH pointers.

The method of the present invention avoids a power-up scan when the service provider is identified as a Forbidden SP; the mobile unit 12 instead returns directly to camping on the known analog control channel 20. See FIG. 4. Once camped on an ACC (box 110), the mobile unit 12 of the present invention looks for a DCCH pointer. When one is received (box 120), the pointed-to channel identification is compared against the identification of the previous DCCH, if there is any (box 130). If the identifications match (box 130), the DCCH pointer is disregarded and the mobile unit 12 remains camped on the ACC (box 110). If the identification does not match (box 130), the new identification is stored (box 140) by the mobile unit 12 and the RSSI of the pointed-to channel is checked (box 150). If the RSSI is not sufficient, the mobile unit 12 returns to camping on the ACC (box 110).

If the RSSI is sufficient (box 160), the mobile unit 12 obtains the service provider identification for the pointed-to DCCH (box 170), typically by decoding the F-BCCH message of the DCCH. Thereafter, the classification of the service provider is checked (box 180). If the service provider information indicates the DCCH belongs to a nonforbidden SP (box 180), the mobile unit 12 camps on the DCCH (box 190). If the service provider information indicates that the service provider is a Forbidden SP (box 180), the mobile unit 12 returns to camping on the known ACC of box 110. Thus, instead of initiating a power-up scan (box 199 of FIG. 3), the mobile unit 12 proceeds directly to camping on what was previously determined to the be the best control channel (box 110). By doing so, service interruptions are minimized and less power is consumed.

It should be noted that the RSSI measurements discussed above (box 150) may take a variety of forms. Because the mobile unit 12 is initially operating in an analog mode, a thorough measurement of the RSSI of the pointed-to digital channel might require a change in operating mode of the physical layer of the mobile unit 12. If so, it may be desirable to run a preliminary RSSI check using the physical layer set in the analog mode. If the preliminary RSSI check results are favorable, then the physical layer could be changed to a digital operating mode and a thorough RSSI could be performed. If either of these RSSI checks fail, the mobile unit 12 would return to camping on the ACC.

The storing of the channel identification described above (box 140) may include storing the communications spectrum 50, channel number, and other channel information.

The discussion above has principally used a cellular mobile telephone as the example of a mobile unit 12. However, it is to be understood that the present invention encompasses any type of mobile unit 12, e.g., a cellular mobile telephone, a pager, a personal communications device, or any other device that uses a wireless communication system 10 having a plurality of service providers, at least one of which is forbidden, and which uses channel pointers.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for responding to a digital control channel pointer received on an analog control channel by a wireless communications mobile unit, comprising:
   a) camping on an analog control channel;
   b) thereafter receiving a first digital control channel pointer designating a first pointed-to digital control channel, said first pointer including channel identification for said first pointed-to control channel;
   c) reading service provider information from said first pointed-to control channel indicating the service provider for said first pointed-to control channel; and
   d) thereafter re-camping on said analog control channel without performing an intervening power-up scan if said service provider information indicates that said service provider is from a forbidden class.

2. The method according to claim 1 further including:
   a) checking the received signal strength of said first pointed-to control channel; and
   b) reading service provider information from said first pointed-to control channel indicating the service provider for said first pointed-to control channel if said received signal strength is acceptable.

3. The method according to claim 1 further including storing said channel identification.

4. The method of claim 3 further including:
   a) receiving a second digital control channel pointer designating a second pointed-to digital control channel; said second pointer including channel identification for said second pointed-to control channel;
   b) comparing said channel identification for said second pointed-to control channel with said stored channel identification; and
   c) disregarding said second pointer if said channel identification for said second pointed-to control channel matches said stored channel identification.

5. The method of claim 1 further including receiving a list of forbidden service provider identification information.

6. The method of claim 5 wherein said service provider information includes SID codes.

7. The method of claim 5 wherein said service provider information includes SOC codes.

8. The method of claim 1 wherein said mobile unit is IS-136 compatible.

9. The method of claim 1 further including camping on said first pointed-to control channel if said service provider information indicates that said service provider if not from a forbidden class.

10. The method of claim 1 wherein said reading of service provider information includes decoding a F-BCCH message.

11. The method of claim 2 wherein said checking the received signal strength includes:
   a) checking the received signal strength of said first pointed-to channel with the wireless communications mobile unit in analog operating mode; and
   b) thereafter checking the received signal strength of said first pointed-to channel with the wireless communications mobile unit in digital operating mode if said analog operating mode signal strength is acceptable or camping on said analog control channel if said analog operating mode signal strength is not acceptable.

12. A method for responding to a digital control channel pointer received on an analog control channel by a wireless communications mobile unit, comprising:
   a) camping on an analog control channel;
   b) thereafter receiving a first digital control channel pointer designating a first pointed-to digital control channel, said first pointer including channel identification for said first pointed-to control channel;
   c) storing said channel identification for said first pointed-to control channel;
   d) checking the received signal strength of said first pointed-to control channel;
   e) reading service provider information from said first pointed-to control channel indicating the service provider for said first pointed-to control channel if said received signal strength is acceptable; and
   f) thereafter re-camping on said analog control channel without performing an intervening power-up scan if said service provider information indicates that said service provider is from a forbidden class.

13. The method claim 12 further including:
   a) thereafter receiving a second digital control channel pointer designating a second pointed-to digital control channel; said second pointer including channel identification for said second pointed-to control channel;
   b) comparing said channel identification for said second pointed-to control channel with said stored channel identification; and
   c) disregarding said second pointer if said channel identification for said second pointed-to control channel matches said stored channel identification.

14. The method of claim 12 further including receiving a list of forbidden service provider identification information.

15. The method of claim 13 wherein said service provider information includes SID codes.

16. The method of claim 13 wherein said service provider information includes SID codes.

17. The method of claim 12 further including camping on said first pointed-to control channel if said service provider information indicates that said service provider if not from a forbidden class.

18. The method of claim 12 wherein said reading of service provider information includes decoding a F-BCCH message.

19. The method of claim 12 wherein said checking the received signal strength includes:
   a) checking the received signal strength of said first pointed-to channel with the wireless communications mobile unit in analog operating mode; and
   b) thereafter checking the received signal strength of said first pointed-to channel with the wireless communications mobile unit in digital operating mode if said analog operating mode signal strength is acceptable or camping on said analog control channel if said analog operating mode signal strength is not acceptable.

20. A method for responding to a digital control channel pointer received on an analog control channel by a wireless communications mobile unit, comprising:
   a) receiving a list of forbidden service provider identification information;
   b) camping on an analog control channel;
   c) thereafter receiving a first digital control channel pointer designating a first pointed-to digital control channel, said first pointer including channel identification for said first pointed-to control channel;
   d) storing said channel identification for said first pointed-to control channel;
   e) checking the received signal strength of said first pointed-to control channel in the mobile unit in analog operating mode;
   f) thereafter checking the received signal strength of said first pointed-to channel with the mobile unit in digital operating mode if said analog operating mode signal strength is acceptable or returning to said camping on said analog control channel if said analog operating mode signal strength is not acceptable;
   g) reading service provider information from said first pointed-to control channel indicating the service provider for said first pointed-to control channel if said received signal strength in digital operating mode is acceptable; and
   h) thereafter re-camping on said analog control channel without performing an intervening power-up scan if said service provider information indicates that said service provider is from a forbidden class or camping on said first pointed-to control channel if said service provider information indicates that said service provider if not from a forbidden class.

21. The method of claim 20 further including:
   a) thereafter receiving a second digital control channel pointer designating a second pointed-to digital control channel; said second pointer including channel identification for said second pointed-to control channel;
   b) comparing said channel identification for said second pointed-to control channel with said stored channel identification; and
   c) disregarding said second pointer if said channel identification for said second pointed-to control channel matches said stored channel identification.

22. The method of claim 20 wherein said service provider information includes SID codes.

23. The method of claim 20 wherein said service provider information includes SOC codes.

24. The method of claim 20 wherein said reading of service provider information includes decoding a F-BCCH message.

* * * * *